Feb. 21, 1950 M. I. GLASS 2,498,413
DOMESTIC UTENSIL SET
Filed July 16, 1947
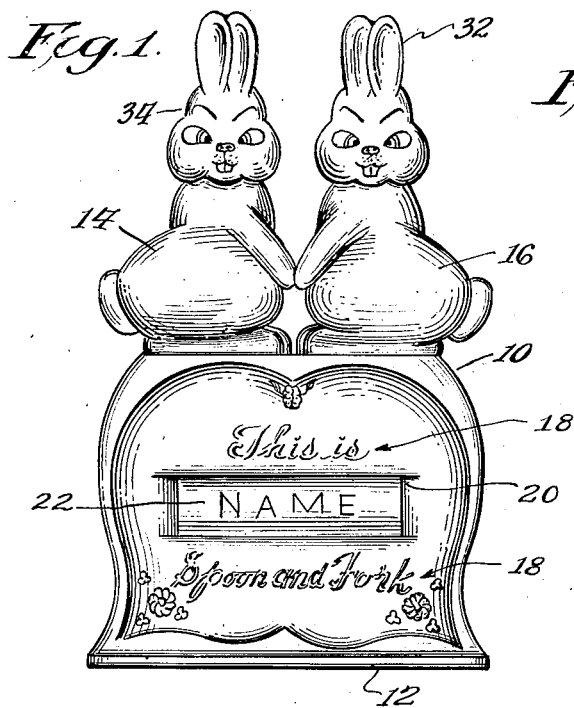
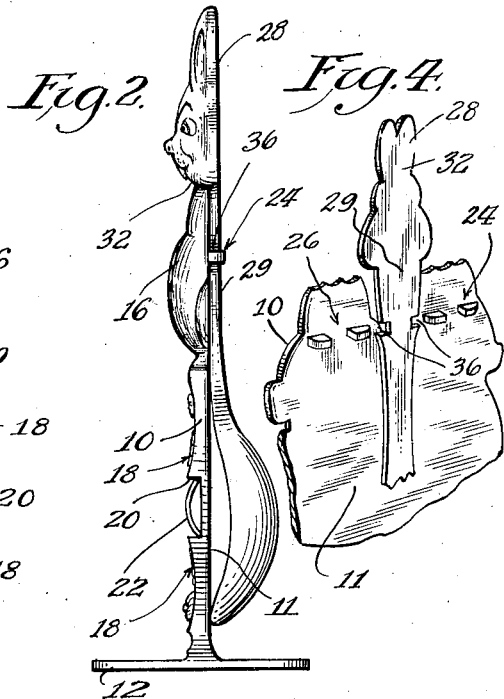
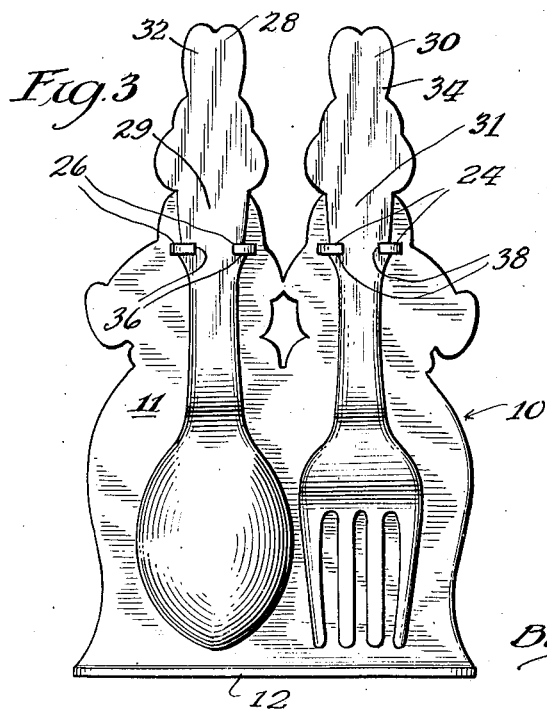
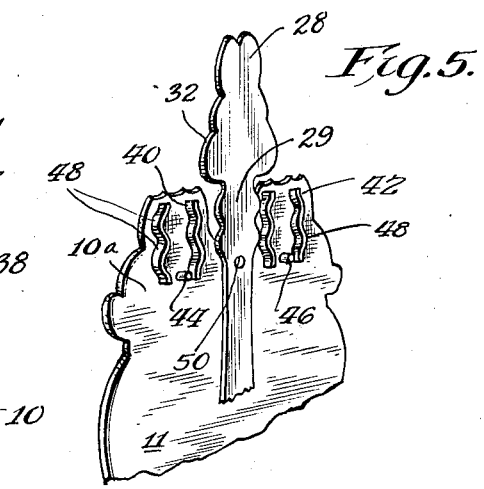
Inventor
Marvin I. Glass
By Max R. Kraus
Atty.

Patented Feb. 21, 1950

2,498,413

UNITED STATES PATENT OFFICE 2,498,413

DOMESTIC UTENSIL SET

Marvin I. Glass, Chicago, Ill.

Application July 16, 1947, Serial No. 761,390

2 Claims. (Cl. 211—60)

This invention relates to a domestic utensil set.

One of the objects of this invention is to provide a domestic utensil set, such as a spoon and fork set, with means for supporting same, the support and utensil combining to present a complete character or design.

Another object is to provide a children's domestic utensil set consisting of a fork and a spoon which are detachably and interchangeably secured on a support, with the support formed to simulate the body portion of a character, animal or figure, and with the head of the figure on the handle of the spoon and fork so that when they are positioned on the support, the character will be presented in complete form as an integral unit.

Other objects will become apparent as this description progresses.

In the drawings:

Fig. 1 is a front view showing the parts in assembled position.

Fig. 2 is a side elevational view of same.

Fig. 3 is a rear view of same.

Fig. 4 is a perspective view of the attaching means, and

Fig. 5 is a rear view of a modified form of attaching means.

The device comprises a vertical support 10, with an integral horizontal base 12, all preferably made of plastic. The front of the vertical support can be molded to form in relief the body portion of an animal or other character, and as shown, is formed to simulate the body portion of two bunnies 14 and 16, although it will be understood that any other characters come within the purview of this invention. The lower front portion of the support can have appropriate inscription 18 molded therein, and a slotted space 20 is provided for inserting a name plate or a card 22.

The back 11 of the support has in close proximity to the top thereof a pair of protuberances 24 and 26 for each of the figures, and each pair serves to accommodate and interchangeably hold the domestic utensils, such as a spoon or fork or knife.

The spoon 28 and the fork 30 are each preferably made of plastic, and the end of the handle portion of each is formed to simulate in relief the head of the figure. In the illustration shown, both heads are identical and the numeral 32 designates the head of the spoon and 34 the head of the fork. The handle portion 29 of the spoon has a pair of slots or openings 36, and the handle portion 31 of the fork has a similar pair of slots or openings 38, which permit the spoon and the fork to be interchangeably secured to the pair of protuberances 24 and 26, best shown in Fig. 3. When thus secured, the spoon and fork are mounted on the support, and the head portion of each alines with the body portion to complete the figure. The head portion being in relief, overhangs the front of the support and combines with the relief body portion so that when viewed from the front it appears as an integral figure.

To remove the spoon or fork, it is only necessary to slip same off the protuberances and they can then be used in the conventional manner.

In Fig 4 is shown a modified form of supporting the spoon and fork and comprises two pairs of flanged portions 40 and 42, integrally formed or secured to the back of the support 10a. A pin 44 and 46 extends between the bottom of each pair of flanged portions. The flanged portions are sinuously shaped, as at 48, complementally to the sinuous shape of the handle of the spoon and fork. The handle of the spoon and fork has an opening 50 which fits into the pin. The spoon and fork can be easily and interchangeably inserted on the support by placing the handle between the flanged portions and the pin in the opening, and the spoon or fork will remain supported until removed. The head of the spoon or fork and the front of the support are constructed similarly to that previously described.

It will be understood that while I have shown a combination of a spoon and fork, that a set can be made consisting of a spoon, fork and knife, in the same manner as that previously described.

I claim:

1. A children's domestic utensil set comprising a horizontal base, a vertical support integrally attached to said base, said support having a portion of a design in relief thereon, the top edge of said portion forming a transversely horizontal seat, attaching means on the back of said vertical support adapted to releasably engage cooperating means on a spoon and fork for the vertical support thereof, the handles of said spoon and fork having a laterally projecting completing portion of said design in relief, the lower edge of which extends transversely horizontal and rests on said seat.

2. A children's domestic utensil set comprising a horizontal base, a vertical support integrally attached to said base, said support having a portion of the design in relief thereon, attaching means on the back of said vertical support adapted to releasably engage cooperting means on a spoon, fork or the like for the vertical support thereof, the handle of said spoon, fork or the like having a laterally projecting completing portion of said design in relief, so that when attached to said support, the laterally projecting completing portion appears as an integral part of the design when viewed from the front.

MARVIN I. GLASS.

REFERENCES CITED

The following references are of record in the file of this patent:

UNITED STATES PATENTS

| Number | Name | Date |
| --- | --- | --- |
| 1,402,635 | Meyer | Jan. 3, 1922 |
| 2,045,830 | Brundage | June 30, 1936 |